United States Patent [19]

Wallace

[11] 4,381,890

[45] May 3, 1983

[54] INCIDENT LIGHT FILTER FOR CAMERAS

[76] Inventor: George A. Wallace, 13695 Uvas Rd., Morgan Hill, Calif. 95037

[21] Appl. No.: 151,391

[22] Filed: May 19, 1980

[51] Int. Cl.³ .................. G03B 7/00; G03B 11/00
[52] U.S. Cl. .................. 354/59; 354/287; 354/295
[58] Field of Search ........... 354/22, 23 R, 59, 287, 354/295, 296; 356/213, 221, 234; 350/255, 266

[56] References Cited

U.S. PATENT DOCUMENTS

| | | | |
|---|---|---|---|
| 2,930,281 | 3/1960 | Dunn | 356/221 |
| 2,983,186 | 5/1961 | Norwood | 356/221 |
| 3,112,684 | 12/1963 | Norwood | 356/221 |
| 4,137,540 | 1/1979 | Curtis | 354/296 |

FOREIGN PATENT DOCUMENTS 1321697  6/1973  United Kingdom ............... 356/221

OTHER PUBLICATIONS

47th Street Photo, Inc., Sep. 1976 Catalog.

Primary Examiner—Russell E. Adams
Attorney, Agent, or Firm—John J. Leavitt

[57] ABSTRACT

Presented in several different aspects is an incident light filter or cap assembly adapted to be attached over the lens of a camera for the purpose of permitting adjustment of the camera controls in view of the incident light conditions that exist at the time the picture is taken.

20 Claims, 16 Drawing Figures

INCIDENT LIGHT FILTER FOR CAMERAS

BACKGROUND OF THE INVENTION b 1. Field of the Invention

This invention relates to filter devices, and more particularly to a filter device for use in conjunction with single-lens reflex cameras with through-the-lens light metering facilities, to enable use of these meters as incident light meters in a method so convenient and accurate as to assure it the popular acceptance which other incident-light methods have been denied.

2. Description of Prior Art

It is believed that prior art related to the subject matter of this invention is classified in Class 350, sub-classes 255 and 266; and Class 356, sub-classes 213, 221 and 234. A search of these classes ans sub-classes has revealed the existence of U.S. Patents as follows: U.S. Pat. Nos. 2,803,162; 2,824,696; 2,879,690; 2,930,281; 2,972,930; 2,983,186 and 3,112,684.

The above listed patents, with the exception of U.S. Pat. No. 3,112,684, relate to light meters equipped with translucent domes which work in conjunction with the light measuring circuits incorporated in the light meter, and thus permit a photographer to take readings or determinations from the light meter that can then be transferred as appropriate settings to a camera. The exception, U.S. Pat. No. 3,112,684, discloses the broad concept of a translucent dome in conjunction with a camera in a permanent relationship that complicates the use of the camera in a conventional manner without the use of the translucent dome. To develop a better understanding of the problems involved with focusing single-lens reflex cameras equipped with through-the-lens metering facilities, it should be understood that there are two basic methods of employing light meters to aid in the determination of camera exposure settings for optimum exposure of a subject being photographed.

THE REFLECTANCE METHOD

The reflectance method of determining exposure settings is common to all single-lens reflex cameras with through-the-lens metering facilities. This method permits optimum exposure settings to be made only for those subjects whose weighted average reflectance values conform to the eighteen percent (18%) reflectance characteristics which camera manufacturers, almost without exception, have arbitrarily established as "average" reflectance. It is not generally known by the vast majority of people using single-lens reflex cameras with through-the-lens metering facilities that the light metering circuits in the camera are "calibrated" to respond to this 18% reflectance characteristic.

To understand how this situation has come about, and why the vast majority of amateur photographers take only "average" photographs because of the "average" conditions or characteristics built into their cameras, it is important to understand the historical development of single-lens reflex cameras having through-the-lens metering facilities.

The Weston Exposure Meter, believed to be the first commercially available hand-held light meter, appeared on the market in 1932 and was capable of indicating for the photographer exposure settings based upon either illumination levels or upon surface brightness values. The "illumination level" approach, known as the "incident light method", was quickly adopted for motion picture work as the best method for maintaining constant image tones for key subject values such as skin tone, despite changes in either illumination level or average brightness of the scene as a whole. By this method, once the aperture setting for use with any given film and illumination level was determined, variations in aperture as indicated by the meter compensate for any changes in illumination level, and all image tones or negative densities related to specific key subject values remained unchanged. No further evaluations or judgements regarding the amount of exposure had to be made by the photographer regardless of whether the scenes themselves are predominantly light, dark, or in between.

With the advent of Weston Exposure Meter, a second method for indicating exposure settings was introduced. This second method, known as the "Reflectance Method", quickly dominated the still photography field. Here, the meters were initially used by professional and advanced amateur photographers working with view cameras and painstaking exposure procedures. Multiple readings of key brightness values were taken of a given scene, including those of the brightest and darkest areas of interest in the subject or scene. These readings were then employed to aid the photographer to previsualize the print as it might appear as a consequence of established variations in film exposure and development, and in determining the optimum exposure and development times for the production of that negative best suited for the rendering of the final print. By this method, in contrast with the "incident light method" described in the preceding paragraph, the photographer was required to thoroughly study his key subject values in each situation, and previsualize them in image tones, before making the exposure. It is understandable therefore why this method was initially restricted to use by professional and advanced amateur photographers.

With the advent of hand-held cameras, photographers initially employed both the "incident light method" and the "reflectance method" for determining exposure values. However, with the great proliferation of hand-held cameras, the vast majority of hand-held camera photographers followed the "reflectance method" and within a decade, hand-held cameras with built-in reflectance type meters were on the market. Today, there are many millions of such cameras, many of them being fast 35 millimeter single-lens reflex cameras equipped with a multitude of complicated electrical, electronic and mechanical devices.

Because of the tremendous numbers of such cameras manufactured and sold, it has become necessary, for mass production purposes, to incorporate in such cameras exposure setting mechanisms designed to respond in the same way to a given brightness of the scene or subject. Adding to the necessity for such "average" exposure characteristics is the fact that millions of rolls of film are sold for use in such cameras and therefore, standard, mass production type film processing procedures have had to be designed to process these millions of rolls of exposed film in a reasonable length of time. To justify such standard film processing procedures it is obvious that the vast majority of film being processed is not "custom" processed. Rather, it is subjected to the mechanical film processing procedures dictated by mass production expediency.

Thus, to satisfy the needs of the masses of people that utilize these cameras and expose these rolls of film, the vast majority of hand-held camera photographers are restricted in the quality of the end product because the exposure readings provided by the camera light meter are "calibrated" to an "average" 18% reflectivity characteristics from the subject, followed by processing of such "average" exposure to a processing procedure that is also "standard" or "average" for the particular type of film being processed. Thus, the buying public has been forced to accept the same constant average density or positive direct image tone in the end product regardless of whether the subject itself is light, dark, or in between. It is thus apparent that while the "reflectance method" may be used to advantage in the still photography field by professional and advanced amateur photographers, the application of the reflectance method to hand-held cameras has heretofore resulted in great loss in the quality of the end product because of the reasons which follow:

Given a subject in uniform lighting, with an average reflectance value of approximately 18%, all values in that subject will appear rendered with optimum tonal placement. This value corresponds with that of a middle-gray card, reflecting five times and one-fifth as much light, respectively, as an arbitrarily chosen black and white. Stated another way, given these conditions, the average reflectance of 18% from a middle-gray card is five times the reflectance from a black card and only one fifth the reflectance from a white card. The constant image tone most camera meters are programmed to render is midway in the range of the transparencies' readable tones, representing values from black to white. In this instance, the subject's average value corresponds with the average value that camera and film are programmed to render, and with the type of film used in producing the transparencies, the margin of error is plus 40% to minus 30%.

Given a subject in the same lighting, but with an average reflectance value substantially less than 18%, it will be rendered in the same image tones as in the case described above, with all values in the subject appearing to have been rendered too dark, and the film appearing to have been underexposed.

Given a subject in the same lighting, but with an average reflectance value substantially greater than 18%, all values will appear too light in the image, and the film will appear to have been overexposed.

Given a strongly side-lit or back-lit subject, as seen from the camera position, the strongly-lit areas may make the average brightness value high, compared with the brightness of those areas in lesser illumination. Then, with the average brightness rendered in the constant average image tones, these other areas appear too dark, and the film, under exposed.

Conversally, the presence of large dark areas behind strongly front-lit subjects could significantly lower the average brightness level of the scene, so that when rendered in the normal constant image tone, the scene appears too light, images of all objects in the scene appear too light, and the film appears overexposed.

From the above it can be seen that if cameras having built-in light meters are intended to automatically indicate or provide the aperture and shutter speed setting for correct exposures, then the results indicated above are evidence of the camera's limitations, rather than of the photographer's lack of ability. While it is true that the meter can be overridden, intimation from publications and data sheets published with respect to the effectiveness of such meters is that it then becomes the photographer's responsibility if inadequate results are achieved, and therefore, the tendency is to follow the meter slavishly. Most photographers, with no capability for evaluating a scene in the meters "averaging" or "weighted average" fashion, have no way of knowing the discrepency between the meter's evaluation and the actual average brightness level required for optimum exposure. Thus, the photographer cannot know how much adjustment to provide even if he realizes that the meter can be overridden. Knowing how much of an adjustment to make is important because with direct color positive transparency films, the maximum permissible margin for error in exposure, consistent with acceptable results, is approximately minus 30% to plus 30%. Subject brightness ratios are often as high as 1:250.

In working with color negatives or black-and-white negatives, the effect of many exposure errors are nullified or concealed by the printing procedure of the final print. However, image details lost through underexposure and image sharpness lost through camera movement while the shutter remained open overly long in overexposures, cannot be restored. Accordingly, it is seen that the overall loss that is suffered by the field of photography is the loss of considerable capability in all fields of photography amenable to hand-held camera treatment, and the inability to know and exploit the full potential of these cameras and films beyond the narrow field of operations within which these cameras are presently programmed to function on their own.

One method of making these hand-held cameras more effective would be to place a plain card of any value facing the camera and in the same illumination as a subject to be photographed, and filling the cameras field of view, to serve as a "standard" value in place of the camera and meter's natural variable value, in establishing exposure settings for a given scene or subject. If such a card were of optimum value for rendering of all values in the same illumination, then it would serve to provide optimum exposure settings for the rendering of all values in any illumination. However, such a card is a cumbersome thing to carry and protect, and often reflects excessive light due to surface glare and, in working with people, it is disruptive and awkward to use in that it is almost impossible to withdraw the subject's attention from the card so as to enable taking an adequate photograph.

Accordingly, it is one of the objects of the present invention to provide a device that is easily attachable to the camera in an unobtrusive manner, which effectively passes substantially the same amount of light to the camera light meter as an optimum gray card reflects so as to permit direct adjustment of the camera aperture and shutter speed settings correctly for the given scene or subject, and which may then be moved from the camera during the picture-taking operation.

This invention thus proposes the use of a light diffusion disc or filter capable of passing a specific portion of the illumination falling upon it to the optical system of any single-lens reflex camera equipped with through-the-lens metering facilities, to simulate the average brightness value (of the subject) required for the optimum rendering of an arbitrary gray scale with reflectance values ranging from white (96%) to black (3%), in that illumination. In accomplishing this purpose, it provides in every instance, a simulated optimum subject brightness value for any given illumination level, and a simulated constant reflectance value regardless of that level of illumination. With this type data transmitted to the light meter embodied in the camera, the aperture and shutter speed may be set accurately while the diffusion device is in place on the camera and is subsequently removed when it is desired to photograph the scene or subject.

A similar function is performed by separate incident light meters, but not in as direct a manner. Thus, with an incident light meter, most of which are expensive, fragile and loseable, the light that is "read" by the meter travels a different path than that forming the image itself. Additionally, such separate incident light meters are cumbersome in that they must be gotten out of whatever resceptacle they are carried in, they must be uncovered and put into use, and once in use, a two stage procedure is required for operation, with attendant further losses in time, mood and rapport with the subject. With such incident light meters, it is necessary to adjust at least one ring or dial, locate and read off aperture numbers and shutter speeds, and transform those into exposure settings on the camera itself, with attendant cumulative small errors adding up as the procedure progresses. Accordingly, it is another object of this invention to eliminate such complexities and chances for error by providing a diffusion cap or filter that is easily attachable to and detachable from the camera so that all that is required is to point the camera with the diffusion device attached away from the subject and toward the source of light, adjust the aperture and shutter speed of the camera, turn back to the subject, remove the diffusion device, focus on the subject and actuate the shutter release.

More specifically, another object of this invention is to provide a diffusion device easily attachable and detachable in front of the lens of a camera and fabricated from a flat translucent disc of plastic, glass or other suitable material.

Still another object of the invention is the provision of a diffusion device of the character described easily attachable and detachable to the lens structure of a camera and which is provided with a semi-sperical shell of translucent plastic, glass or other suitable material.

A still further object of the invention is the provision of a diffusion device in conjunction with a camera equipped with a lens hood that permits operation of the camera with the hood retracted so as to accommodate incident light, or with the hood extended to diminish the effect of incident light, or at least to control the angle from which such light impinges upon the diffusion device.

A still further object of the invention is the provision of a diffusion device for application to a camera that permits adjusting the aperture and shutter speed settings without the necessity of reading any dials or scales to achieve proper aperture and shutter speed settings.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the diffusion device of the invention comprises a flat disc, a semi-spherical shell, or a spherical structure, all of which are translucent to a specific degree, and each of which is equipped with a flange structure adapted to attach and detach the structure from the lens assembly of a camera. In one aspect of the invention, the diffusion device is associated with a lens hood and can be used to admit light to the metering facilities of the camera with the hood either extended or retracted. In another aspect, the invention comprises the method of determining the appropriate amount of light to admit to the camera for a given scene or subject through use of the diffusion device and without the need to refer to numerical scales or dials of any kind.

DESCRIPTION OF THE PREFERRED EMBODIMENT

It is clear from the discussion above that neither the "reflectance" method nor the "incident light" method are ideally suited for use with the single-lens reflex camera equipped with through-the-lens metering facilities. In conjunction with the "reflectance" method it is obvious that the use of a gray card with a hand-held single-lens reflex camera equipped with through-the-lens metering facilities is too cumbersome and inconvenient to be used by the great majority of photographers. Use of such card for determining the proper setting of the camera in anything but a studio environment has proved awkward, inconvenient and, despite knowledge of this method, has never gained favor with hand-held camera phtographers.

In like manner, the "incident light" method has the disadvantage that it requires the use of a second and independent light metering facility in the form of a fragile hand-held meter pointed directly toward the source of illumination with exposure settings being indicated by the meter in accord with the strength of that illumination and the sensitivity of film to which the meter is attenuated. There is of course no question that this is an excellent method for accurately evaluating exposure conditions and determining exposure settings. However, the "incident light" method utilizing a separate hand-held meter does require the additional adjusting and reading of meter dials, and a manual translation of those readings into actual exposure control settings on the camera itself. These additional steps introduce a margin of error and a level of inconvenience and additional cost that has worked to prevent the wide acceptance of the "incident light" method by photographers.

I have found that the light diffusion device forming the subject matter of this invention is inexpensive, easy to apply, and provides a more accurate basis for the setting of camera controls then the methods described above. To that end, in terms of greater detail, and as illustrated in the drawings, I have provided a translucent filter or cap adapted to be mounted on a camera lens assembly, or on a lens hood, and which functions to transmit or pass to the built-in camera light meter approximately 18% of the light impinging upon the filter. The filter may be prismatic in addition to being translucent so as to diffuse the light impinging thereon. The translucent filter or diffuser passes approximately 18% of the light falling upon it to activate the built-in light meter whereas the gray card discussed above depends upon its "reflectance" characteristics which commonly do not approximate 18% of the light falling upon the subject for many reasons. It will thus be seen that the translucent filter or diffuser provided by this invention is far simpler, faster, more convenient, and practical and durable in use, and provides a better and more accurate measure of the light falling upon the scene or subject. Additionally, the translucent filter or diffuser avoids the gray card problem of surface glare, a factor often resulting in erroneous readings.

In another aspect, the translucent filter or diffuser forming the subject matter of this invention may be considered as a means for establishing optimum aperture and shutter speed settings directly from illumination levels, rather than from reflectance brightness values, as is customary in hand camera use. In this respect, the incident light translucent filter or diffuser is designed to work in conjunction with any camera through-the-lens light meter to cooperate directly with the camera in a way similar to the way in which separate hand-held incident light meters function, but eliminating the intermediate steps of observing readings on the separate hand-held meter and transferring such readings to appropriate dials and settings on the camera itself.

Additionally, it should be noted that separate apart from the camera hand-held incident light meters that employ translucent discs or domes are especially designed to function with light sensitive cells and amplifiers specifically attenuated to produce the desired results when used in the manner prescribed. By contrast, the incident light translucent filter or diffuser of this invention functions with any single-lens reflex camera equipped with through-the-lens metering facilities, and is independent of any specially attenuated light cells and amplifiers.

To emphasize the simplicity and the accuracy with which a camera can be adjusted which is equipped with the incident light translucent filter or diffuser of this invention, as compared with adjustments achieved through use of a separate hand-held light meter, it is noted that these separate hand-held light meters are capable only of indicating optional pairs of aperture and shutter speed settings. Options must be read and considered, one pair of settings chosen, and the aperture ring and shutter speed knob of the camera adjusted to translate and incorporate in the camera the readings derived by the separate hand-held light meter. This complicated procedure is in contrast to the use of the incident light translucent filter or diffuser of this invention which works in conjunction with the camera's built-in light meter to almost instantly provide appropriate settings.

Figure 1:
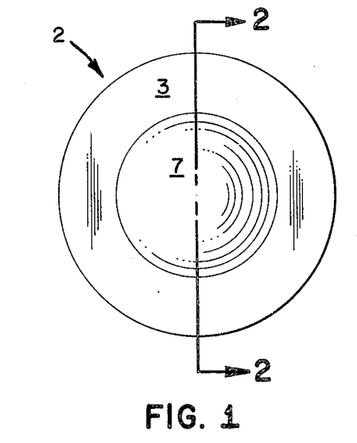
FIG. 1 is a front elevational view of one form of the diffusion device forming the subject matter of this invention.

Structurally, the incident light translucent filter or lens cap of the invention is depicted in several different embodiments in the drawings so as to indicate that the concept of providing a translucent filter or diffuser over the lens assembly, which passes only approximately 18% of the light impinging thereupon, can be incorporated in several different ways. Referring to FIG. 1, there is there shown in one embodiment a translucent filter or lens cap diffuser assembly designated generally by the numeral 2 and including a flat annular portion 3, preferably fabricated from an appropriate synthetic resinous material, which may or may not be translucent, and which is provided on its outer periphery with a cylindrical flange 4 having threads 6 on the inner periphery thereof for attachment to complimentary threads on the lens assembly.

Figure 15:
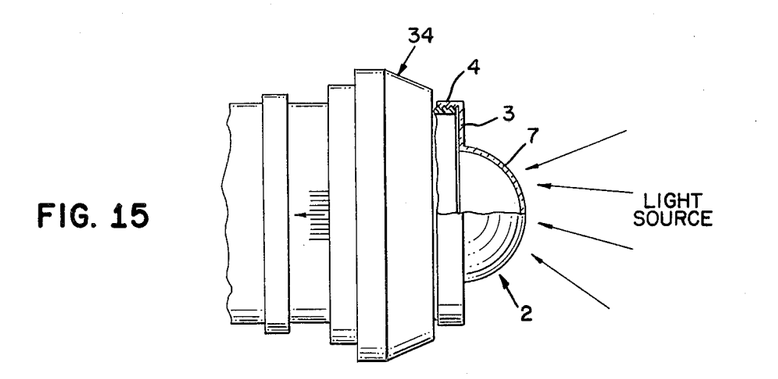
FIG. 15 is a fragmentary plan view of a lens assembly partly in vertical section illustrating the embodiment of the diffusion device illustrated in FIG. 2 mounted on the lens assembly.

The inner periphery of the annular member 3 has integrally joined to it a translucent semi-spherical dome 7, also fabricated from synthetic resinous material, and projecting from the plate 3 in a direction opposite to the flange 4. The translucent dome 7 is fabricated so as to transmit or pass therethrough 18% of the light that is incident upon it. Thus, as illustrated in FIG. 15, when the translucent filter 2 is applied to the lens assembly of a camera, the camera may be pointed in the direction of the light source and only approximately 18% of such light will pass through the filter and impinge on the built-in light meter of the camera, thus enabling proper aperture and shutter speed settings of the camera while the camera is pointed directly toward the light source with the translucent filter or diffuser in place. Thereafter, all that remains is for the translucent filter to be removed from the camera, the camera pointed toward the subject or scene to be photographed, and the focus ring of the camera manipulated to achieve the proper focus, whereupon the shutter may be actuated to properly expose the film with the correct quantity of light and for the proper time interval.

Figure 2:
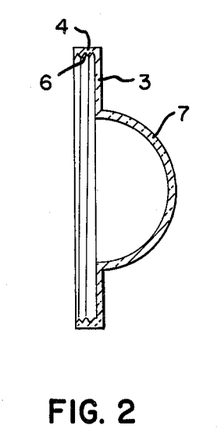
FIG. 2 is a vertical cross-sectional view taken in the plane indicated by the line 2—2 in FIG. 1.
Figure 3:
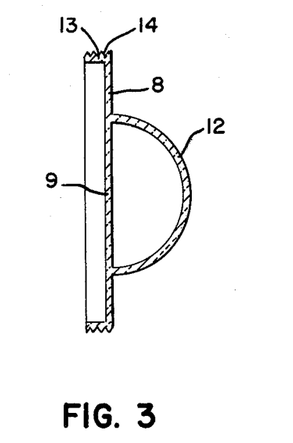
FIG. 3 is a vertical cross-sectional view similar to FIG. 2 but showing a modified embodiment.
Figure 4:
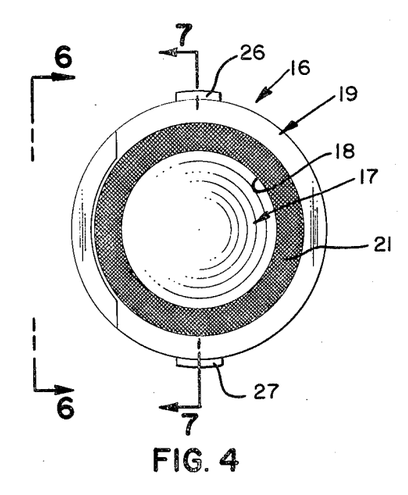
FIG. 4 is a front elevational view of a modified clip-on version of the diffusion device.
Figure 5:
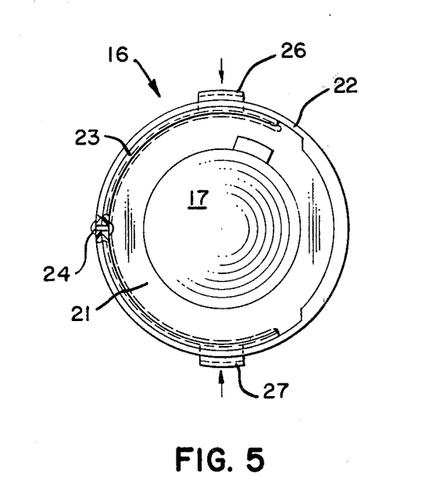
FIG. 5 is a rear elevational view of the clip-on type diffusion device depicted in FIG. 4.
Figure 6:
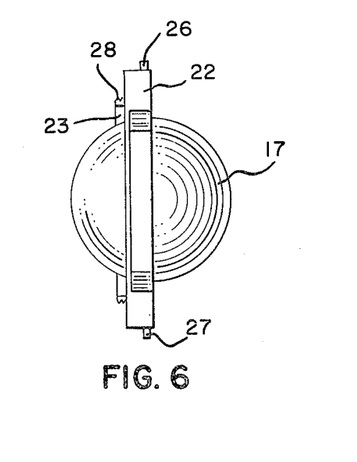
FIG. 6 is a side elevational view of the diffusion device depicted in FIG. 4 and taken in the direction indicated by the arrows 6—6 therein.
Figure 7:
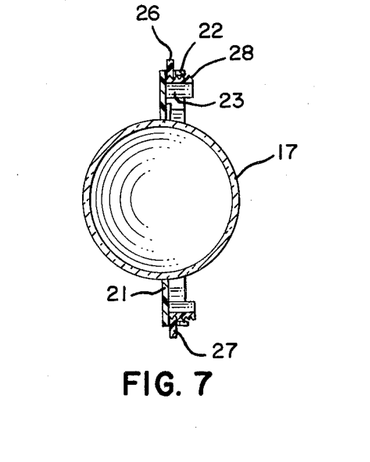
FIG. 7 is a vertical cross-sectional view taken in the plane indicated by the line 7—7 in FIG. 4.
Figure 14:
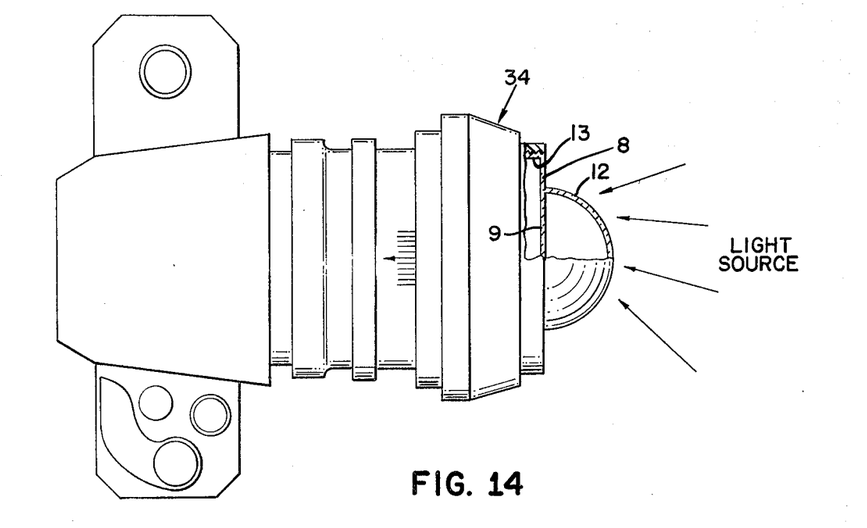
FIG. 14 is a plan view of a camera showing the embodiment of the diffusion device illustrated in FIG. 3 mounted on the lens assembly.

The embodiment of the invention illustrated in FIG. 3 is similar to the embodiment illustrated in FIGS. 1 and 2 with only minor mechanical modifications. For instance, in the embodiment of FIG. 3 the plate 8 is circular in configuration rather than annular, and includes a central portion 9 underlying the dome 12 to provide a double thickness of translucent material through which incident light passes to reach the built-in camera light meter. Additionally, the cylindrical mounting flange 13 in this embodiment is provided with external threads 14 adapted for use with lens assemblies provided with internal threads. The attachment of this embodiment to a lens assembly is illustrated in FIG. 14.

In the embodiment of the invention illustrated in FIGS. 4 through 7 and FIG. 16, the translucent filter or diffuser device is designated generally by the numeral 16 and includes a translucent sphere 17 centrally disposed and permanently mounted on the interior periphery 18 of a mounting ring 19 which comprises a radially outwardly extending flat plate portion 21 terminating at its outer periphery in a cylindrical flange 22. The cylindrical flange has mounted within its confines a semi-circular resilient mounting member 23 attached at its midpoint to the cylindrical flange by an appropriate fastening means such as a rivet 24 or appropriate screw, and having on opposite free ends radially extending lugs 26 and 27 that project through appropriate slots in the cylindrical flange to permit manipulation of the mounting member 23.

Figure 16:
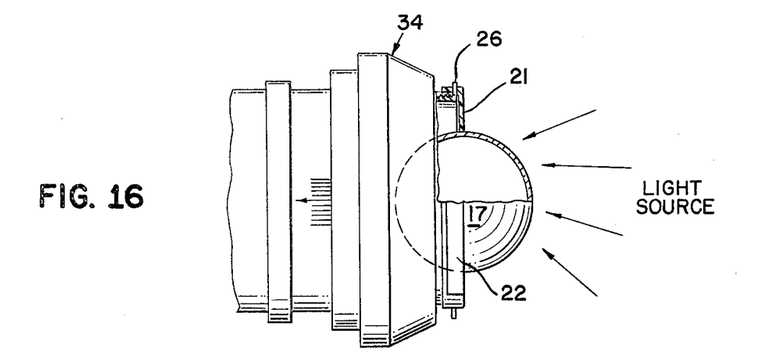
FIG. 16 is a fragmentary plan view illustrating the embodiment of the diffusion device illustrated in FIGS. 6 and 7 mounted on a lens assembly.

The outer peripheral surface 28 of the mounting member 23 is provided with appropriate threads adapted to engage complimentary threads formed on the inner periphery of a lens assembly as illustrated in FIG. 16. To attach or detach the translucent filter device from the camera lens assembly, all that is required is that the lugs 26 and 27 be digitally manipulated in the direction of the arrows in FIG. 5, for instance, to depress the mounting member 23 to thus lessen its diameter, apply the assembly to the lens ring of the camera and release the lugs so as to permit the inherent resilience of the mounting member 23 to expand the mounting member 23 and thereby engage the threads of the mounting member 23 with the threads of the lens ring. The reverse procedure is followed to release the translucent filter from the camera.

In this embodiment, as illustrated in FIG. 16, a portion of the spherical translucent filter member 17 projects into the hollow or recess normally found in front of the lens of the camera, while the opposite portion of the spherical translucent filter projects forwardly toward the light source so that light from the light source impinging upon the spherical translucent filter member passes through two thicknesses of the translucent material before it reaches the light meter built into the camera. In this respect, it may be said that this embodiment of the invention is similar in this respect to the embodiment illustrated in FIG. 3 because in that embodiment also the light passes through two separate layers of translucent material. In each case, the layers of translucent material are graduated so that the total amount of light passing through both layers of translucent material approximates 18% of the light incident upon the filter assembly.

It has been found that a dome-shaped filter or diffuser as illustrated in FIGS. 1 through 7 and 14 through 16 is particularly useful where it is desired to adjust the exposure and shutter speed controls of the camera in view of the total light or illumination in the immediate area of the scene or subject, including light arriving at the camera from the sides, top and bottom thereof. All of this light, including light directly from the light source, impinging on the dome-shaped translucent filter passes through the filter and is diffused so as to provide an accurate measure of the total light available to the scene or subject, thus enabling setting of the camera aperture and shutter speed control to achieve optimum rendering of the scene or subject on the film.

Just as it sometimes happens that the photographer wants to set the aperture and shutter speed controls of the camera in relation to the total light available from all sources, so too in some instances and for specific purposes, a photographer may want to eliminate light emanating from one direction or from a specific source, and adjust the camera shutter speed and aperture in relation to illumination from light entering the camera solely from a specific direction or source. In that instance, reference being made to the embodiment of the invention illustrated in FIGS. 8 through 13, the translucent filter or diffuser of the invention takes the form of a flat translucent disc 31, fabricated preferably from an appropriate synthetic resinous material that is formulated and gauged in thickness to pass 18% of the light incident into the lens system. The outer periphery of the translucent plate 31 is provided with a cylindrical flange 32 provided with circumferentially spaced slits 33 as shown to provide some resilience to the circumference of the cylindrical flange 32 to permit it to be slipped over the lens assembly designated generally by the numeral 34 in FIGS. 11-13.

Figure 8:
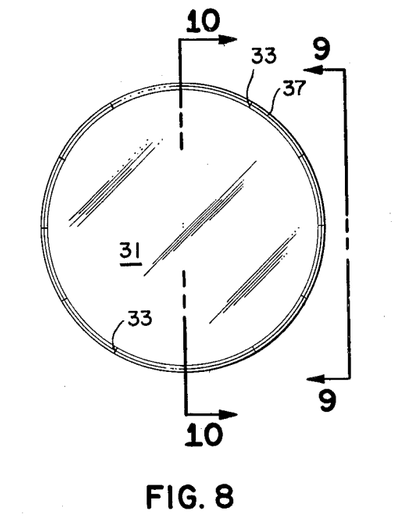
FIG. 8 is a front elevational view of a third and preferred embodiment of the invention.
Figure 9:
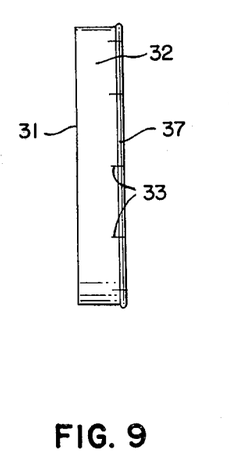
FIG. 9 is a side elevational view taken in the direction indicated by the arrows 9—9 in FIG. 8.
Figure 10:
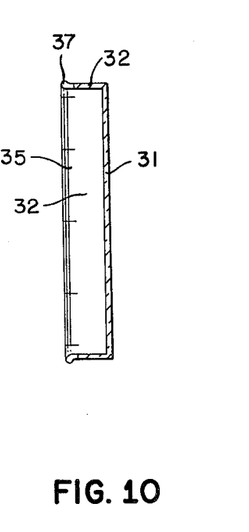
FIG. 10 is a vertical cross-sectional view taken in the plane indicated by the line 10—10 in FIG. 8.
Figure 11:
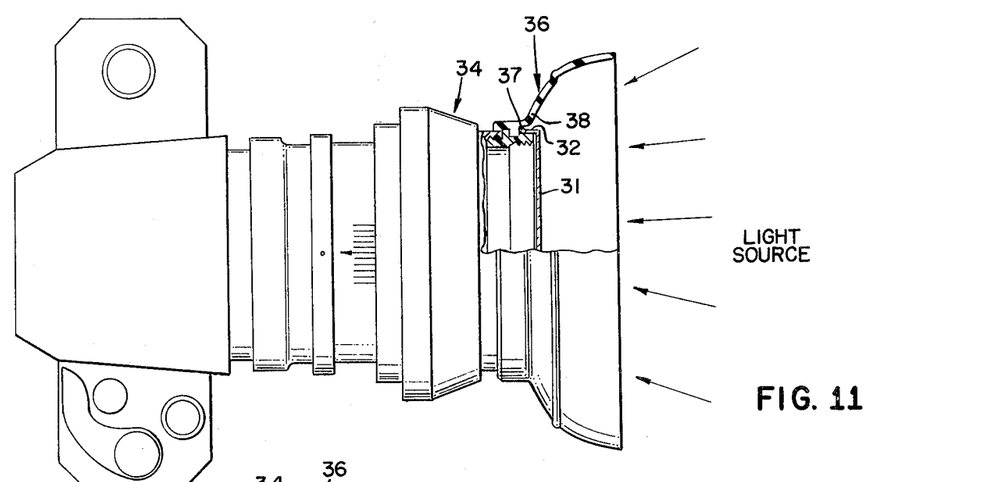
FIG. 11 is a plan view illustrating a camera having attached to the lens assembly thereof a lens hood and having associated with the lens assembly and mounted on the hood the diffusion device depicted in FIG. 8.
Figure 12:
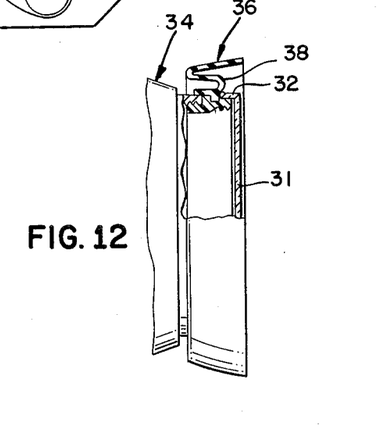
FIG. 12 is a fragmentary elevational view partly in vertical section illustrating the diffusion device of the invention mounted on a lens hood shown in retracted position.

It will of course be obvious from FIG. 11, that the translucent filter or diffuser 31–33 depicted in FIGS. 8 through 10 may also be applied to the lens assembly 34 in conjunction with a lens hood 36. It should be obvious that the translucent filter or diffuser illustrated in FIGS. 8-10 may also be applied to a lens assembly from which the lens hood 36 has been omitted. In that case, when the camera is pointed toward the source of light falling on the scene or subject, 18% of that light energy will pass through the translucent filter or diffuser 31 and provide the basis for setting the aperture and shutter speed control on the camera. Under these conditions only light from the direction desired will impinge upon the translucent plate 31. When the flat translucent filter or diffuser is used in conjunction with a lens hood as illustrated in FIG. 11, it will be clear that less light will impinge on the surface of the filter plate 31 then is the case when the filter is used without the lens hood, resulting in the necessity to set the aperture control so as to provide a larger aperture, thus admitting essentially the same amount of light as would be the case without the lens hood and a smaller aperture.

Figure 13:
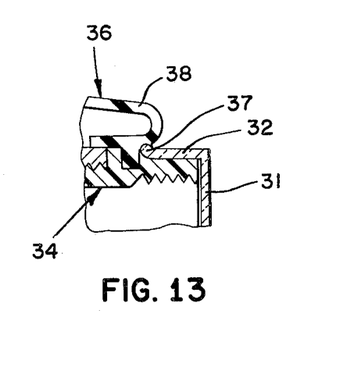
FIG. 13 is a fragmentary sectional view on an enlarged scale illustrating attachment of the lens hood to the lens assembly and attachment of the diffusion device on the lens hood.

In conjunction with the use of a lens hood, preferably fabricated from a resilient and flexible rubber or synthetic resinous material, it has been found advantageous to form the peripheral edge of the cylindrical flange 32 with a radially outwardly extending bead 37 as shown best in FIGS. 9, 10 and 13. It has been found that for use in conjunction with the lens hood, in addition to the resilient grasp that the cylindrical flange 32 has on the end of the lens adaptor, the beaded end 37 of the translucent filter is resiliently grasped by the forwardly projecting portion 38 of the hood, this forwardly projecting portion being spaced radially from the outer periphery of the lens adaptor so as to resiliently accomodate the beaded end of the cylindrical flange. It has been found that such a cooperative relationship between the translucent filter or diffuser and the resilient hood is beneficial in that it prevents inadvertent dislocation of the filter device even when the hood is collapsed in the manner indicated in FIGS. 12 and 13. Obviously, in this condition of the lens hood, the effect is to admit light from the sides of the camera so as to impinge on the translucent filter as previously discussed.

Having thus described the invention, what is claimed to be new and novel and sought to be protected by Letters Patent of the United States is as follows:

1. In combination with a single-lens reflex camera having a through-the-lens built-in light metering facility including light-sensitive cells and a lens assembly for admitting light to activate said light metering facility and for focusing an image of a photographic subject on film within the camera, a translucent image-blocking device detachably secured in front of said lens assembly whereby approximately 18% of the light from a source thereof impinging on said translucent image-blocking device passes therethrough and through said lens assembly to activate the light sensitive cells in said built-in light metering facility whereby adjustment of the exposure controls of the camera may be set after which said translucent image-blocking device is removed to permit the image of the photographic subject to pass through the lens assembly when the subject is photographed.

2. The combination according to claim 1, in which said translucent device includes a flat translucent plate.

3. The combination according to claim 1, in which said lens assembly is provided with external threads on its outer periphery, and said translucent device includes a cylindrical flange having internal threads adapted to engage external threads on said lens assembly.

4. The combination according to claim 1, in which said lens assembly includes a cylindrical flange portion having internal threads thereon, and said translucent device includes a cylindrical flange having external threads thereon adapted to engage the internal threads on said lens assembly.

5. In combination with a single lens reflex camera having a through-the-lens built-in light metering facility including light sensitive cells and a lens assembly for admitting light to activate said light metering facility, a translucent device detachably secured in front of said lens assembly whereby approximately 18% of the light impinging on said translucent device passes therethrough and through said lens assembly to activate the light sensitive cells in said built-in light metering facility, said lens assembly including a cylindrical flange portion having threads on the interior periphery thereof, and said translucent device includes a cylindrical flange, a resilient member mounted within said cylindrical flange, digitally manipulable lugs projecting from said cylindrical flange and manipulable to resiliently flex said resilient member whereby said translucent device may be detachably applied to said lens assembly by engaging the flexible member with the interior periphery of said cylindrical flange on the lens assembly.

6. In combination, a lens hood adapted to be detachably secured to the lens assembly of a single-lens reflex camera having a built-in through-the-lens light meter, and a translucent image blocking light-transmitting device detachably mounted in said lens hood.

7. The combination according to claim 6, in which said lens hood is symmetrical about a longitudinal axis, and said translucent device includes a flat plate extending transversely across said longitudinal axis and adapted to transmit therethrough approximately 18% of the light impinging thereon.

8. A translucent device for use in conjunction with single-lens reflex cameras equipped with through-the-lens light meter facilities, comprising:

(a) a generally flat translucent image-blocking plate symmetrical about a longitudinal axis and adapted to transmit approximately 18% of the light impinging thereon; and (b) means on the outer periphery of said translucent image-blocking plate and adapted for detachable support in conjunction with the lens assembly of an associated camera.

9. The combination according to claim 8, in which said flat translucent plate is circular in configuration.

10. In combination with a single lens reflex camera having a through-the-lens built-in light metering facility including light sensitive cells and a lens assembly for admitting light to activate said light metering facility, a translucent device detachably secured in front of said lens assembly whereby approximately 18% of the light impinging on said translucent device passes therethrough and through said lens assembly to activate the light sensitive cells in said built-in light metering facility, said translucent device including a translucent dome-shaped member.

11. The combination according to claim 10, in which said translucent device includes a flat translucent plate extending transversely across the lens assembly, and said translucent dome-shaped member is adherent to said translucent flat plate member and centrally disposed thereon and projecting in a direction remote from said lens assembly.

12. In combination with a single-lens reflex camera having a through-the-lens built-in light metering facility including light sensitive cells and a lens assembly for admiting light to activate said light metering facility, a translucent device detachably secured in front of said lens assembly whereby approximately 18% of the light impinging on said translucent device passes therethrough and through said lens assembly to activate the light sensitive cells in said built-in light metering facility, said lens assembly being provided with a forwardly projecting cylindrical flange portion defining a recess, and said translucent device includes a translucent spherical member one portion of which extends into said recess and the other portion of which projects in a direction remote from said lens assembly.

13. In combination with a single-lens reflex camera having a through-the-lens built-in light metering facility including light sensitive cells and a lens assembly for admiting light to activate said light metering facility, a translucent device detachably secured in front of said lens assembly whereby approximately 18% of the light impinging on said translucent device passes therethrough and through said lens assembly to activate the light sensitive cells in said built-in light metering facility, said lens assembly including a forwardly projecting cylindrical flange, a lens hood detachably mounted on said forwardly projecting cylindrical flange on the lens assembly, and said translucent device is detachably mounted on said lens hood.

14. In combination with a single-lens reflex camera having a through-the-lens built-in light metering facility including light sensitive cells and lens assembly for admiting light to activate said light metering facility, a translucent device detachably secured in front of said lens assembly whereby approximately 18% of the light impinging on said translucent device passes therethrough and through said lens assembly to activate the light sensitive cells in said built-in light metering facility, said lens assembly being provided with a forwardly projecting cylindrical flange, a lens hood detachably mounted on said lens assembly and including a generally cylindrical adaptor ring concentrically disposed with respect to said lens assembly and a generally conical shell structure extending forwardly therefrom, said translucent device being detachably mounted on said generally cylindrical adaptor ring are resiliently retained detachably thereon by said shell member.

15. In combination, a lens hood adapted to be detachably secured to the lens assembly of a single-lens reflex camera having a built-in through-the-lens light meter, and a translucent device detachably mounted on said lens hood, said lens hood including a generally cylindrical adaptor ring including a cylindrical portion projecting toward and detachably securable to said lens assembly and a cylindrical portion projecting in a direction remote from said lens assembly, a flexible resilient hood member mounted on said adaptor ring intermediate said cylindrical portion and extending radially outwardly and forwardly therefrom in a generally truncated conical configuration to provide in its extended position a forward edge remote from said translucent device to shield the translucent device against the impingement of light thereon from the sides thereof and in its retracted position having its forward edge lying in a plane substantially coincident with the front face of said translucent device, in both extended and retracted positions said hood member resiliently engaging said translucent device to retain the translucent device thereon.

16. In combination, a lens hood adapted to be detachably secured to the lens assembly of a single-lens reflex camera having a built-in through-the-lens light meter, and a translucent device detachably mounted on said lens hood, said lens hood being symmetrical about a longitudinal axis that is coincident with the longitudinal axis of the lens assembly on which it is adapted to be mounted, and said translucent device includes a dome-shaped translucent member centrally disposed and symmetrical with respect to the longitudinal axis.

17. In combination, a lens hood adapted to be detachably secured to the lens assembly of a single lens reflex camera having a built-in through-the-lens meter, and a translucent device detachably mounted on said lens hood, said lens hood being symmetrical about a longitudinal axis, and said translucent device includes a flat translucent plate extending transversely across said longitudinal axis, and a dome-shaped translucent member superimposed on said flat translucent plate to provide two-spaced layers of translucent material through which approximately 18% of the light impinging on said device passes from one side of the translucent device to the other.

18. In combination, a lens hood adapted to be detachably secured to the lens assembly of a single-lens reflex camera having a built-in through-the-lens light meter, and a translucent device detachably mounted in said lens hood, said hood assembly being symmetrical about a longitudinal axis, and said translucent device includes a generally spherical translucent member providing two-spaced semi-spherical layers of translucent material through which approximately 18% of the light impinging on said translucent device is permitted to pass from one side of the translucent device to the other.

19. A translucent device for use in conjunction with single-lens reflex cameras equipped with through-the-lens meter facilities, comprising:
   (a) a generally flat translucent plate symmetrical about a longitudinal axis and adapted to transmit approximately 18% of the light impinging thereon;
   (b) a flange projecting from the outer periphery of said translucent plate and adapted for detachable support in conjunction with the lens assembly of an associated camera; and
   (c) a translucent dome-shaped member mounted on said flat translucent plate.

20. A translucent device for use in conjunction with single-lens reflex cameras equipped with through-the-lens light meter facilities, comprising:
   (a) a generally flat translucent plate symmetrical about a longitudinal axis and adapted to transmit approximately 18% of the light impinging thereon;
   (b) a flange projecting from the outer periphery of said translucent plate and adapted for detachable support in conjunction with the lens assembly of an associated camera;
   (c) said flat translucent plate being annular, and a dome-shaped member secured to the inner periphery of said annular flat translucent plate.

* * * * *